(12) United States Patent
Shih et al.

(10) Patent No.: US 9,874,970 B2
(45) Date of Patent: Jan. 23, 2018

(54) TOUCH DISPLAY DEVICE AND DRIVING METHOD THEREOF

(71) Applicant: FocalTech Systems, Co. Ltd., Hsinchu (TW)

(72) Inventors: Po-Sheng Shih, Hsinchu (TW); Chien-Yung Cheng, Hsinchu (TW)

(73) Assignee: FOCALTECH SYSTEMS, CO. LTD., Hsinchu (TW)

( * ) Notice: Subject to any disclaimer, the term of this patent is extended or adjusted under 35 U.S.C. 154(b) by 55 days.

(21) Appl. No.: 15/074,685

(22) Filed: Mar. 18, 2016

(65) Prior Publication Data

US 2017/0115799 A1   Apr. 27, 2017

Related U.S. Application Data

(60) Provisional application No. 62/244,204, filed on Oct. 21, 2015.

(30) Foreign Application Priority Data

Nov. 30, 2015 (TW) .............................. 104139813 A
Dec. 25, 2015 (TW) .............................. 104143694 A

(51) Int. Cl.
*G06F 3/041* (2006.01)

(52) U.S. Cl.
CPC .......... *G06F 3/0416* (2013.01); *G06F 3/0412* (2013.01); *G06F 2203/04105* (2013.01); *G06F 2203/04106* (2013.01)

(58) Field of Classification Search
CPC .................... G06F 3/041; G06F 3/044; G06F 2203/04103; G06F 2203/04105; G06F 2203/04106
See application file for complete search history.

(56) References Cited

U.S. PATENT DOCUMENTS

| | | | |
|---|---|---|---|
| 8,891,048 B2 | 11/2014 | Park | |
| 2010/0149128 A1 | 6/2010 | No | |
| 2010/0309146 A1 | 12/2010 | Lee | |
| 2010/0309162 A1* | 12/2010 | Nakanishi | ............... G06F 3/044 345/174 |

(Continued)

FOREIGN PATENT DOCUMENTS

| | | |
|---|---|---|
| CN | 102117146 A | 7/2011 |
| CN | 103455202 A | 12/2013 |

(Continued)

*Primary Examiner* — MD Saiful A Siddiqui
(74) *Attorney, Agent, or Firm* — Muncy, Geissler, Olds & Lowe, P.C.

(57) ABSTRACT

A touch display device including a first substrate, a second substrate, a display medium layer, a pixel array structure and a pressure sensing electrode layer is provided. The display medium layer is disposed between the first substrate and the second substrate. The pixel array structure is disposed between the second substrate and the display medium layer and includes a plurality of pixel electrodes and a multi-function electrode layer overlapping the pixel electrodes. The pressure sensing electrode layer is parallel to the multi-function electrode layer and a changeable gap is formed between the pressure sensing electrode layer and the multi-function electrode layer. The touch display device capable of 3D touch is provided.

20 Claims, 6 Drawing Sheets

(56) References Cited

U.S. PATENT DOCUMENTS

| | | | |
|---|---|---|---|
| 2012/0062511 A1* | 3/2012 | Ishizaki | G06F 3/044 345/174 |
| 2012/0218199 A1* | 8/2012 | Kim | G06F 3/0412 345/173 |
| 2013/0044384 A1 | 2/2013 | Kim | |
| 2013/0050126 A1 | 2/2013 | Kimura et al. | |
| 2014/0198268 A1 | 7/2014 | Sugita | |
| 2014/0225839 A1 | 8/2014 | Dunphy | |
| 2014/0247239 A1* | 9/2014 | Jamshidi-Roudbari | G06F 3/0414 345/174 |
| 2015/0261348 A1 | 9/2015 | Jang | |
| 2015/0370396 A1 | 12/2015 | Hotelling | |
| 2016/0092015 A1* | 3/2016 | Al-Dahle | G06F 3/044 345/174 |
| 2016/0252766 A1* | 9/2016 | Liu | G02F 1/1333 |

FOREIGN PATENT DOCUMENTS

| | | |
|---|---|---|
| CN | 104756050 A | 7/2015 |
| TW | 201508602 A | 3/2015 |
| TW | 201508603 A | 3/2015 |

\* cited by examiner

TOUCH DISPLAY DEVICE AND DRIVING METHOD THEREOF

CROSS-REFERENCE TO RELATED APPLICATION

This application claims the priority benefit of U.S. provisional application Ser. No. 62/244,204, filed on Oct. 21, 2015. The entirety of the above-mentioned patent application is hereby incorporated by reference herein and made a part of this specification.

BACKGROUND OF THE INVENTION

Field of the Invention

The invention relates to a touch display device, and particularly relates to a touch display device with a build-in touch element.

Description of Related Art

Touch function has become a necessary function in electronic products in the current consumer market. Particularly, by integrating the touch function with a display function, an advantage of intuitive operation is achieved. Namely, a user may directly click a display image to execute a desired function of the electronic product. However, along with expanding application of such type of electronic products, a single touch sensing function for a touch position is no longer satisfactory to a market demand, and if a pressing force of a touch operation is further distinguished besides the touch position sensing function, the touch sensing function can be more diversified, so as to implement more operation modes.

SUMMARY OF THE INVENTION

The invention is directed to a touch display device, which has a build-in touch element and is capable of sensing a touch pressure besides sensing a touch position.

The invention provides a touch display device including a first substrate, a second substrate, a display medium layer, a pixel array structure and a pressure sensing electrode layer. The display medium layer is disposed between the first substrate and the second substrate. The pixel array structure is disposed between the second substrate and the display medium layer. The pixel array structure includes a plurality of pixel electrodes and a multi-function electrode layer overlapping with the pixel electrodes. The pressure sensing electrode layer is parallel to the multi-function electrode layer and a changeable gap is formed between the pressure sensing electrode layer and the multi-function electrode layer.

The invention provides a driving method of a touch display device, which includes following steps. The aforementioned touch display device is provided. A display mode is implemented. A first touch mode is implemented to perform touch sensing through the multi-function electrode layer, and signals of the pressure sensing electrode layer and the multi-function electrode layer are synchronized. A second touch mode is implemented, and an operating potential is input to the pressure sensing electrode layer, and touch sensing is performed through the multi-function electrode layer.

According to the above descriptions, the touch display device in the embodiment of the present invention takes an electrode layer in the pixel array structure to serve as a touch sensing electrode layer and further includes the pressure sensing electrode layer, so as to sense a touch pressure by using the pressure sensing electrode layer and the electrode layer originally in the pixel array structure. Therefore, besides sensing a touch position, the touch display device of the invention may further detect a touch pressure to provide diversified touch sensing operations. In other words, the touch display device is capable of 3D touch.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
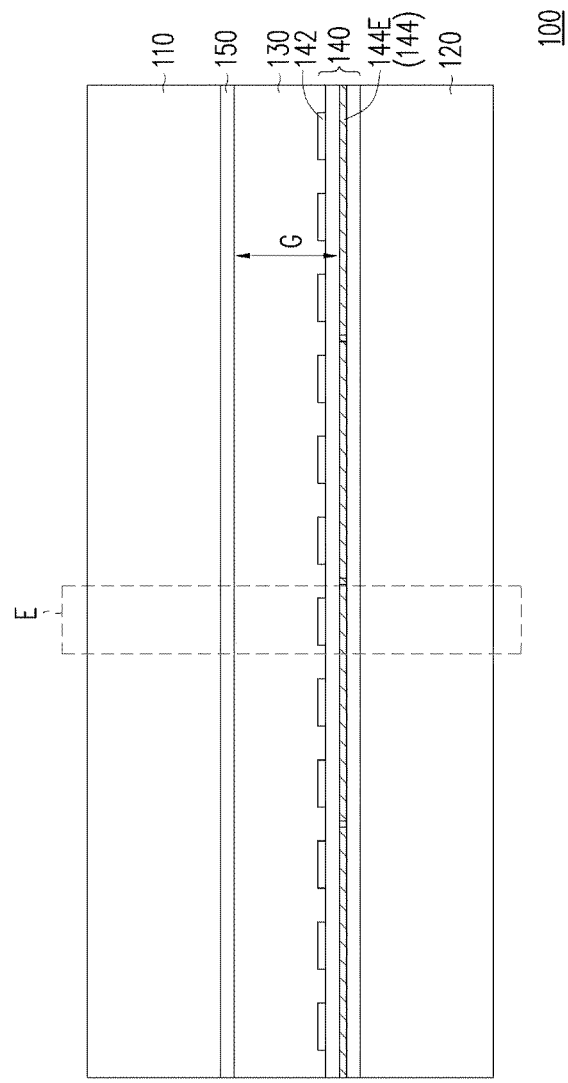
FIG. 1 is a cross-sectional view of a touch display device according to an embodiment of the present invention.

FIG. 1 is a cross-sectional view of a touch display device according to an embodiment of the present invention. Referring to FIG. 1, the touch display device 100 includes a first substrate 110, a second substrate 120, a display medium layer 130, a pixel array structure 140 and a pressure sensing electrode layer 150. The display medium layer 130 is disposed between the first substrate 110 and the second substrate 120. The pixel array structure 140 is disposed between the second substrate 120 and the display medium layer 130. The pixel array structure 140 includes a plurality of pixel electrodes 142 and a multi-function electrode layer 144, and the pixel electrodes 142 are overlapped with the multi-function electrode layer 144. The pressure sensing electrode layer 150 is parallel to the multi-function electrode layer 144. In the present embodiment, the pixel electrodes 142 can be partially overlapped with the multi-function electrode layer 144.

In the present embodiment, a material of the first substrate 110 and the second substrate 120 can be glass, plastic or a composite material. When the user presses the touch display device 100, a distance between the first substrate 110 and the second substrate 120 is changed to form a changeable gap G between the pressure sensing electrode layer 150 and the multi-function electrode layer 144. In an embodiment, in order to avoid excessive compression of the distance between the first substrate 110 and the second substrate 120, at least one spacer (not shown) can be disposed between the first substrate 110 and the second substrate 120 to maintain the proper distance between the first substrate 110 and the second substrate 120. In some embodiments, spacers (not shown) with two different heights can be disposed between the first substrate 110 and the second substrate 120, where the spacers with one height may lean against both of the first substrate 110 and the second substrate 120, and the other may only lean against one of the first substrate 110 and the second substrate 120, such that when the touch display device 100 is touched and pressed, the distance between the first substrate 110 and the second substrate 120 is allowed to be varied.

A material of the display medium layer 130 can be a non-solid material, for example, a liquid crystal material, an electrophoretic material, an electro-wetting material, or a combination thereof. Therefore, when the user presses the touch display device 100, the changeable gap G can be changed. Alternatively, the material of the display medium layer 130 can be a solid material, for example, an organic light-emitting material or a semiconductor material, and a gap can be formed between the display medium layer 130 and the first substrate 110, so as to allow a change of the changeable gap G when the user presses the touch display device 100.

The pixel electrodes 142 and the multi-function electrode layer 144 can be used to form a driving electric field to drive the display medium layer 130 to implement a display function. The pixel electrodes 142 and the multi-function electrode layer 144 can be all composed of a transparent conductive material (for example, an indium tin oxide layer or similar) or composed of a conductive layer with sufficient light transparency (for example, a metal grid layer or similar). Moreover, the multi-function electrode layer 144 may include a plurality of independent multi-function electrodes 144E, and the multi-function electrodes 144E may independently perform touch sensing to implement a touch sensing function. Therefore, the multi-function electrode layer 144 may serve as electrodes for driving the display medium layer 130 during display and may also serve as electrodes used for implementing touch sensing. Moreover, each of the multi-function electrodes 144E of the multi-function electrode layer 144 is used for sensing a position of a finger of the user or a touch position of a stylus, and any resolution thereof is applicable as long as a touch area can be approximately recognized. Therefore, compared to the pixel electrodes 142, the size of the multi-function electrodes 144E can be larger, and an area of the multi-function electrode may cover a plurality of pixel electrodes 142, for example, two or more pixel electrodes 142.

The pressure sensing electrode layer 150 and the multi-function electrode layer 144 are opposite to each other and are respectively disposed on the first substrate 110 and the second substrate 120. When the user touches the touch display device 100, the pressure sensing electrode layer 150 and the multi-function electrode layer 144 can be used to sense a variation amount of the changeable gap G to detect a touch pressure and further measure a value of the touch pressure. Namely, besides that the multi-function electrode layer 144 may implement touch sensing alone, the multi-function electrode layer 144 can also be used in collaboration with the pressure sensing electrode layer 150 to implement the touch sensing.

In the present embodiment, a driving method of the touch display device 100 includes implementing a plurality of modes, and one of the modes is a display mode. When the display mode is implemented, a display potential can be input to the pixel electrodes 142, a common potential is input to the multi-function electrode layer 144 and a fixed potential is input to the pressure sensing electrode layer 150.

Now, the pixel electrodes 142 and the multi-function electrode layer 144 may form a driving electric field therebetween to drive the display medium layer 130. Moreover, the fixed potential can be the common potential or a ground potential, so that the pressure sensing electrode layer 150 is not floating under the display mode, so as to avoid influencing a display effect of the display medium layer 130. In the display mode, the multi-function layer 144 can serve as a common electrode.

In the driving method of the touch display device 100, another mode is a first touch mode. Under the first touch mode, the multi-function electrode layer 144 performs the touch sensing, and signals of the pressure sensing electrode layer 150 and the multi-function electrode layer 144 are synchronized. The multi-function electrode layer 144 may perform self-capacitive touch sensing under the first touch mode. In an embodiment, each of the multi-function electrodes 144E of the multi-function electrode layer 144 can be independently charged or discharged. When the user touches the touch display device 100 by using a finger or a touch medium such as a stylus, etc., the electric field on the multi-function electrode layer 144 is changed to generate a corresponding sensing signal. Now, the pixel electrodes 142 can be floating, such that a state of the display medium layer 130 is not liable to be changed due to the influence of the first touch mode, so as to maintain a normal display quality. Moreover, under the first touch mode, the signals of the pressure sensing electrode layer 150 and the multi-function electrode layer 144 can be synchronized, such that existence of the pressure sensing electrode layer 150 does not influence a sensing effect of the multi-function electrode layer 144 under the first touch mode.

In the driving method of the touch display device 100, the other mode is a second touch mode, also a pressure touch mode. Under the second touch mode, an operating potential is input to the pressure sensing electrode layer 150, and touch sensing is performed through the multi-function electrode layer 144. Now, the pixel electrodes 142 can be floating to maintain a display function. Under the second touch mode, the operating potential can be the fixed potential, such as the ground potential or the common potential. In another embodiment, under the second touch mode, a variable potential inverted and synchronous to the signal of the multi-function electrode layer 144 or a variable potential non-inverted and synchronous but having a different amplitude relative to the signal of the multi-function electrode layer 144 can be input to the pressure sensing electrode layer 150 to serve as the operating potential. When the fixed potential is input to the pressure sensing electrode layer 150, the electric field on the multi-function electrode layer 144 is related to the pressure sensing electrode layer 150. When the changeable gap G between the multi-function electrode layer 144 and the pressure sensing electrode layer 150 is changed, the electric field sensed by the multi-function electrode layer 144 is also changed. Therefore, when the user touches or presses the touch display device 100 by using a touch medium, the multi-function electrode layer 144 may sense an electric field variation caused by the touch operation of the touch medium and may also sense an electric field variation caused by the change of the changeable gap G.

In the present embodiment, the sensing signal sensed under the second touch mode relates to a touch position and a touch pressure, and the sensing signal sensed under the first touch mode relates to the touch position. Therefore, a difference between the sensing signals received by the multi-function electrode layer 144 under the first touch mode and the second touch mode may be taken as a pressure touch sensing signal value of the touch display device 100 to determine a magnitude of the touch pressure.

Moreover, implementing frequencies of the display mode, the first touch mode and the second touch mode are independent to each other. For example, the display mode, the first touch mode and the second touch mode can be sequentially and repeatedly implemented. Alternatively, in another embodiment, the touch display device 100 is driven in a sequence of the first touch mode, the display mode and the second touch mode. Moreover, the first touch mode and the second touch mode can be respectively implemented between two display modes; for example, the display mode, the first touch mode, the display mode, the second touch mode are sequentially implemented. Now, the implementing frequency of the display mode is higher than that of the first touch mode and the second touch mode. Alternatively, the first touch mode and the second touch mode may have different implementing frequencies. For example, one second touch mode is implemented each time after two first touch modes are implemented, and vice versa. The implementing frequencies and implementing sequence of the aforementioned modes are only used as an example, which can be adjusted according to different requirements of different embodiments.

Figure 2:
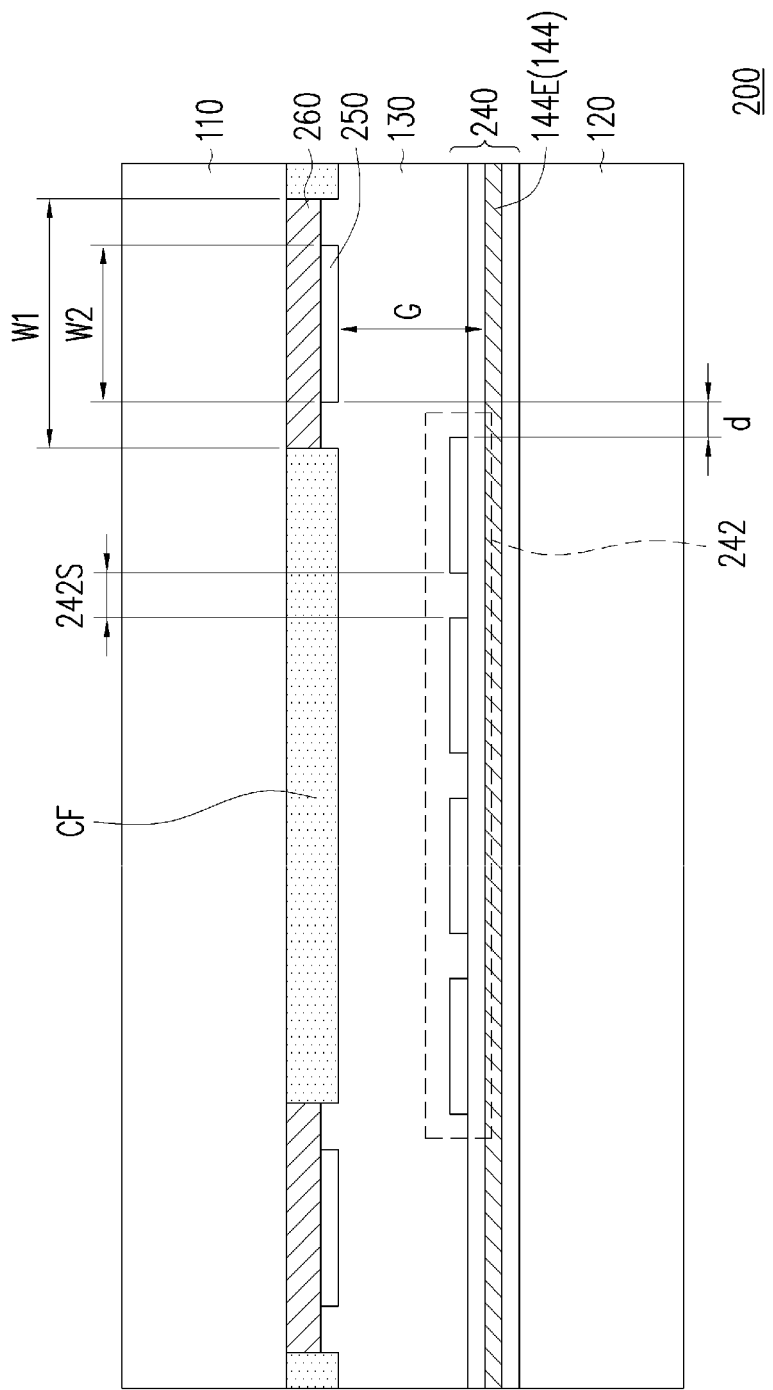
FIG. 2 is a cross-sectional view of a touch display device according to another embodiment of the present invention.

FIG. 2 is a cross-sectional view of a touch display device according to another embodiment of the present invention. Referring to FIG. 2, which relates to a partial portion E depicted in FIG. 1, besides the first substrate 110, the second substrate 120, the display medium layer 130, a pixel array structure 240 and a pressure sensing electrode layer 250, the touch display device 200 further includes a black matrix layer 260. Configuration positions, structures and functions of the first substrate 110, the second substrate 120 and the display medium layer 130 may refer to related descriptions of the aforementioned embodiment, and details thereof are not repeated. Moreover, a driving method of the touch display device 200 can be the same as the driving method of the aforementioned embodiment.

Figure 3:
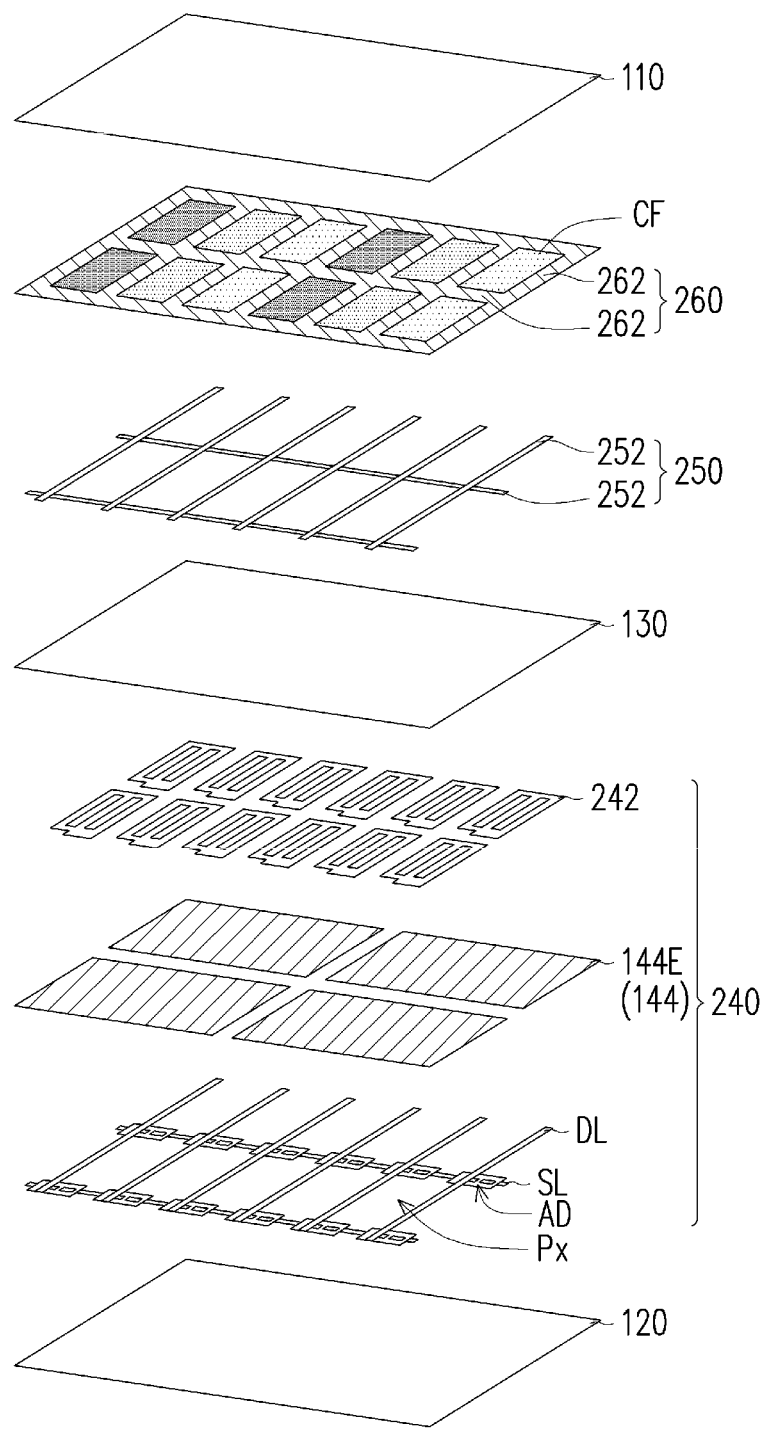
FIG. 3 is a schematic diagram of a first substrate 110, a second substrate 120, a display medium layer 130, a pixel array structure 240, a pressure sensing electrode layer 250 and a black matrix layer 260 of the touch display device 200 of FIG. 2.

FIG. 3 is a schematic diagram of the first substrate 110, the second substrate 120, the display medium layer 130, the pixel array structure 240, the pressure sensing electrode layer 250 and the black matrix layer 260 of the touch display device 200 of FIG. 2. In FIG. 3, each of the aforementioned components is presented in a planar form to represent an upper and lower stacking relationship of these components. However, these components actually have a specific thickness, respectively. Referring to FIG. 2 and FIG. 3, the multi-function electrode layer 144 of the pixel array structure 240 is located between pixel electrodes 242 and the second substrate 120, and the pixel electrodes 242 have a plurality of slits 242S. However, in other embodiments, the pixel electrodes 242 can be selectively located between the multi-function electrode layer 144 and the second substrate 120, and the multi-function electrode layer 144 may selectively have a plurality of slits. Orthogonal projections of the slits on the second substrate 120 are overlapped with orthogonal projections of the multi-function electrodes 144E on the second substrate 120. The display potential and the common potential are respectively input to the pixel electrodes 242 and the multi-function electrode layer 144 under the display mode, and a driving electric field can be produced at edges of the slits 242S to drive the display medium layer 130.

The pixel array structure 240 may include a plurality of scan lines SL, a plurality of data lines DL, a plurality of active devices AD, a plurality of pixel electrodes 242 and a multi-function electrode layer 144. The scan lines SL and the data lines DL are intersected to form a plurality of pixel regions Px. The pixel electrodes 242 are disposed in the pixel regions Px. Each of the active devices AD is turned on or turned off under control of one of the scan liens SL, and when the active device AD is turned on, the active device AD may input the display potential transmitted on one of the data lines DL to the pixel electrode 242.

When the touch display device 200 is in the first touch mode, the pixel electrodes 242 are floating, and each of the multi-function electrodes 144E of the multi-function electrode layer 144 can be independently charged or discharged, and the signals of the pressure sensing electrode layer 250 and the multi-function electrode layer 144 are synchronized. In the second touch mode, the pixel electrodes 242 are floating, the fixed potential is input to the pressure sensing electrode layer 250, and each of the multi-function electrodes 144E of the multi-function electrode layer 144 independently performs touch sensing.

In the present embodiment, the pressure sensing electrode layer 250 includes a plurality of electrode strips 252. An orthogonal projection of the pixel electrodes 242 on the second substrate 120 and an orthogonal projection of the electrode strips 252 on the second substrate 120 are spaced by a distance d, such that the potential of the pixel electrodes 242 is not influenced by a potential on the electrode strips 252, and the display images are maintained stable in both of the first touch mode and the second touch mode. Meanwhile, the orthogonal projection of the electrode strips 252 on the second substrate 120 is overlapped with an orthogonal projection of the multi-function electrode layer 144 on the second substrate 120. Therefore, under the second touch mode, the fixed potential on the electrode strips 242 may influence the electric field sensed by the multi-function electrode layer 144. Therefore, when the changeable gap G between the pressure sensing electrode layer 250 and the multi-function electrode layer 144 is changed, the multi-function electrode layer 144 may sense a corresponding change to sense the corresponding touch pressure.

Moreover, the black matrix layer 260 is disposed between the pressure sensing electrode layer 250 and the first substrate 110, and the black matrix layer 260 can be configured with a plurality of color filter patterns CF. The black matrix layer 260 includes a plurality of light-shielding strips 262 encircling a plurality of openings to accommodate the color filter patterns CF. The color filter patterns CF may have different colors to provide a color filter effect. A width W1 of the light-shielding strip 262 is greater than a width W2 of the electrode strip 252, and the electrode strips 252 are located within an area of the light-shielding strips 262 as shown in FIG. 2. The light-shielding strips 262 may shield the electrode strips 252 to avoid the user perceiving existence of the electrode strips 252, so that the touch display device 200 may simultaneously have a touch sensing function and a pressure sensing function under the premise of not influencing visibility of the touch display device. The light-shielding strips 262 include a plurality of longitudinal light-shielding strips and a plurality of latitudinal light-shielding strips to form a grid, and the electrode strips 252 are correspondingly connected to form a grid. A wiring trajectory, a line width and a wiring density of the electrode strips 252 can be adjusted according to different requirements. For example, in other embodiments, the electrode strips 252 may only have longitudinal electrode strips or latitudinal electrode strips, or a gap between the electrode strips 252 can be a multiple of a gap between the light-shielding strips 262.

Figure 4:
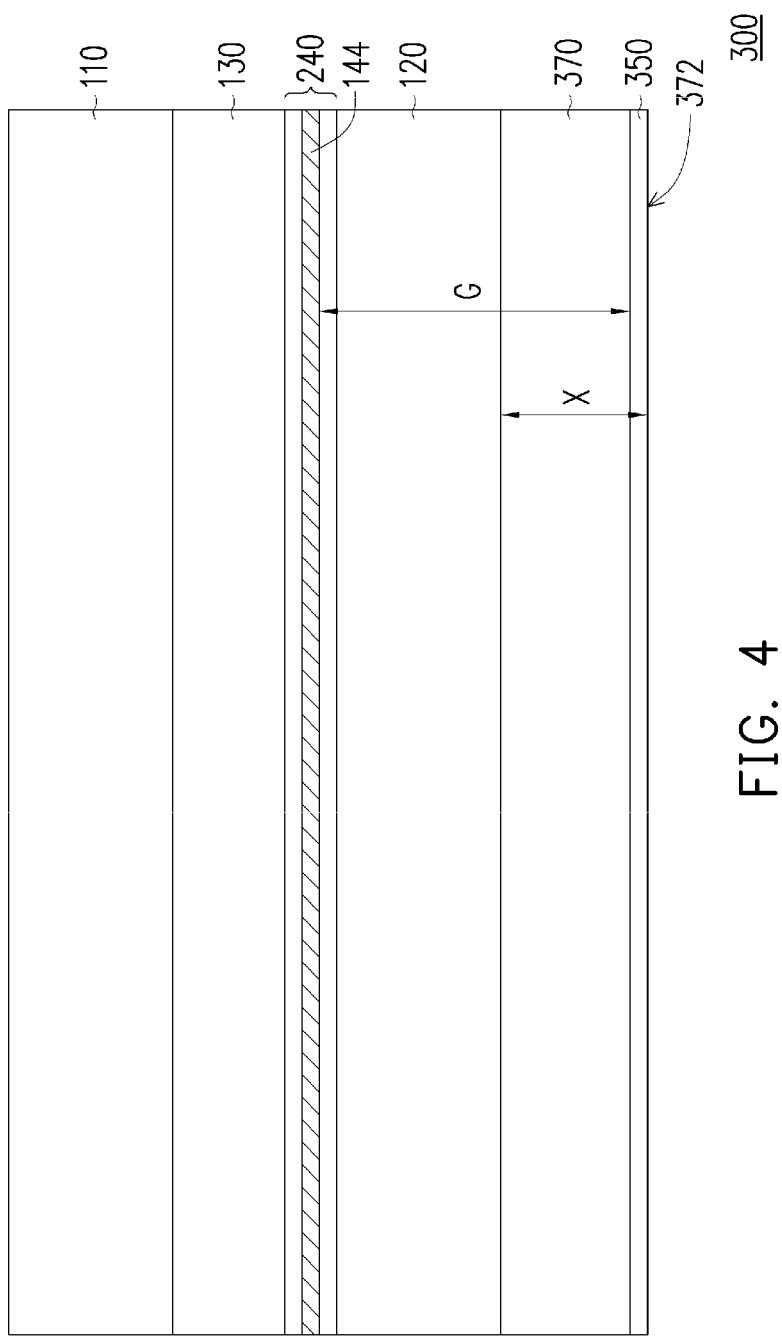
FIG. 4 is a cross-sectional view of a touch display device according to another embodiment of the present invention.
Figure 5:
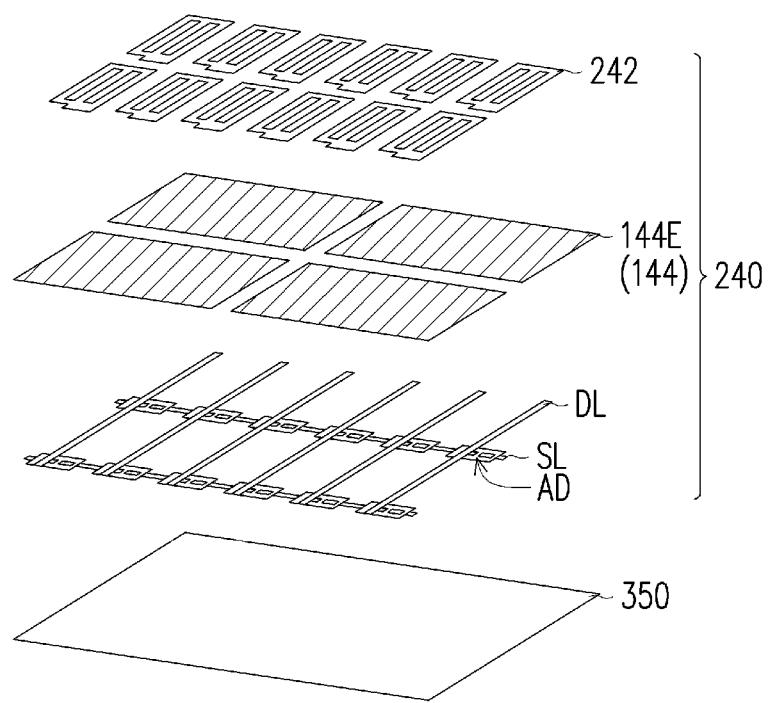
FIG. 5 is a schematic diagram of partial components in the touch display device 300 of FIG. 4.

FIG. 4 is a cross-sectional view of a touch display device according to another embodiment of the present invention. FIG. 5 is a schematic diagram of partial components in the touch display device 300 of FIG. 4. Referring to FIG. 4 and FIG. 5, the touch display device 300 includes a first substrate 110, a second substrate 120, a display medium layer 130, a pixel array structure 240, a pressure sensing electrode layer 350 and a backlight module 370. In the present embodiment, referential numbers of a part of the components are the same with that of the components of the aforementioned embodiments, which represents that these components can be implemented by adopting the related implementations of the aforementioned embodiment. The display medium layer 130 is disposed between the first substrate 110 and the second substrate 120. The pixels array structure 240 is disposed between the second substrate 120 and the display medium layer 130. The pixels array structure 240 includes a plurality of pixel electrodes 242 and a multi-function electrode layer 144, and the pixel electrodes 242 are overlapped with the multi-function electrode layer 144. The pressure sensing electrode layer 350 is parallel to the multi-function electrode layer 144. The pixel array structure 240 is substantially similar to the pixel array structure 240 of the aforementioned embodiment, and the pressure sensing electrode layer 350 is located under the pixel array structure 240. Therefore, in the present embodiment, the multi-function electrode layer 144 is located between the pixel electrodes 242 and the pressure sensing electrode layer 350.

In the present embodiment, the second substrate 120 is located between the first substrate 110 and the backlight module 370, and the pressure sensing electrode layer 350 is disposed on one side of the backlight module 370 away from the second substrate 120. In the present embodiment, the backlight module 370 includes a back plate 372, where the back plate 372 is spaced by a distance X from the second substrate 120, and the pressure sensing electrode layer 350 is disposed on the back plate 372. Therefore, the pressure sensing electrode layer 350 and the multi-function electrode layer 144 have a changeable gap G therebetween. In an embodiment, the pressure sensing electrode layer 350 is an entire piece of a conductive layer, for example, a conductive back plate. In other embodiments, the pressure sensing electrode layer 350 can be an entire piece of reflector with a conductive property. In this way, the pressure sensing electrode layer 350 may serve as a reflector in the backlight module 370. In some embodiments, the pressure sensing electrode layer 350 can be a conductive thin-film (a conductive layer formed on a thin-film) adhered to the back plate 372. In some embodiments, the pressure sensing electrode layer 350 can be adhered on one side of the back plate 372 away from the second substrate 120. It should be noted that the pressure sensing electrode layer 350 can be disposed on a rigid substrate, for example, a back plate or a light guide plate, etc., and the multi-function electrode layer 144 can be disposed on a substrate with a flexible material, such that when the touch display device is subjected to an external force, the changeable gap G is changed to sense the exerted pressure. The pressure sensing electrode layer 350 and the multi-function electrode layer 144 can be disposed in inversion to form the changeable gap G.

A driving method of the touch display device 300 includes implementing the display mode, the first touch mode and the second touch mode. When the display mode is implemented, the display potential and the common potential are respectively input to the pixel electrodes 242 and the multi-function electrode layer 144. When the first touch mode is implemented, the multi-function layer 144 is used to implement the touch sensing, and the signals of the pressure sensing electrode layer 350 and the multi-function electrode layer 144 are synchronized. When the second touch mode is implemented, the fixed potential is input to the pressure sensing electrode layer 350, and the multi-function electrode layer 144 is used to implement the touch sensing. The fixed potential can be the ground potential or the common potential. In some embodiments, when the second touch mode is implemented, a variable potential inverted and synchronous to the signal of the multi-function electrode layer 144 or a variable potential non-inverted and synchronous but having a different amplitude relative to the signal of the multi-function electrode layer 144 can be input to the pressure sensing electrode layer 350. Moreover, when the first touch mode and the second touch mode are implemented, the pixel electrodes 242 can be floating to maintain the display potential.

In the present embodiment, the back plate 372 and the second substrate 120 are spaced by the distance X, and the distance X can be varied to achieve the changeable gap G between the pressure sensing electrode layer 350 and the multi-function electrode layer 144. When the second touch mode is implemented, the multi-function electrode layer 144 may sense the electric field caused by the pressure sensing electrode layer 350. Therefore, the change of the distance X (i.e. the change of the changeable gap G) caused by the user when the user presses the touch display device 300 can be sensed under the second touch mode. Now, the touch display device 300 may use a difference between the sensing signals received by the multi-function electrode layer 144 under the first touch mode and the second touch mode as a pressure touch sensing signal value to determine the touch pressure.

Figure 6:
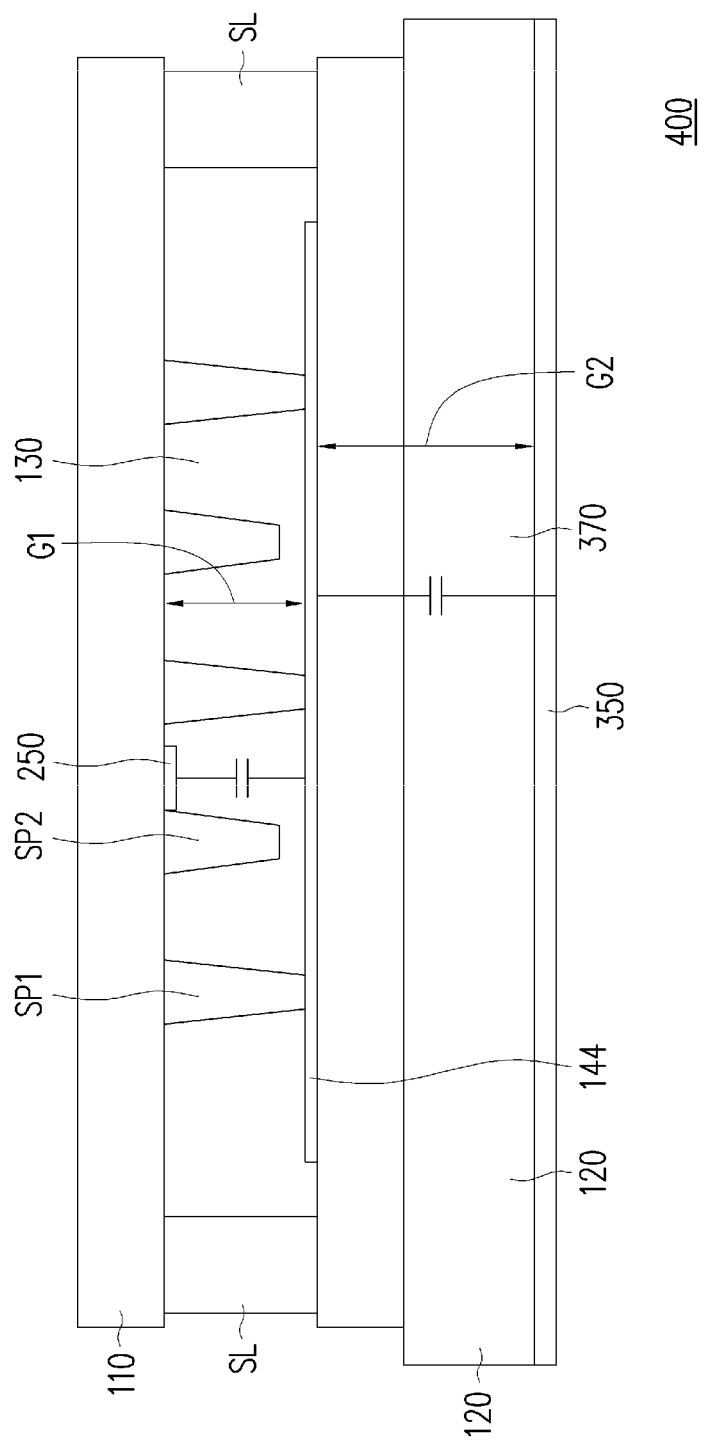
FIG. 6 is a cross-sectional view of a touch display device according to further another embodiment of the present invention.

FIG. 6 is a cross-sectional view of a touch display device according to further another embodiment of the present invention. As shown in the drawing, the touch display device 400 is configured with a pressure sensing electrode layer 250 between the first substrate 110 and the display medium layer 130 and a pressure sensing electrode layer 350 at a side of the second substrate 120 away from the backlight module 370. Accordingly, a changeable gap G1 can be formed between the multi-function electrode layer 144 and the pressure sensing electrode layer 250 and a changeable gap G2 is formed between the multi-function electrode layer 144 and the pressure sensing electrode layer 350, respectively. The multi-function electrode layer 144 can be served as driving electrode for pressure sensing function while the pressure sensing electrode layer 250 and the pressure sensing electrode layer 350 are served as the electrodes receiving the pressure sensing signals. In other embodiment, the multi-function electrode layer 144 can drive and receive the signals by itself under the second touch mode. In an instance, in the present embodiment, the external force applied onto the touch display device 400 can be calculated by using the changed amount of the changeable gap G1 between the pressure sensing electrode layer 250 and the multi-function electrode layer 144 or the changed amount of the changeable gap G2 between the pressure sensing electrode layer 350 and the multi-function electrode layer 144 in response to the strength of the external force. Other components and the driving methods can refer to the above embodiments and are not repeated here.

In addition, a sealant S, spacers SP1 and spacers SP2 can be disposed between the first substrate 110 and the second substrate 120. The sealant S surrounds the display medium layer 130 to seal the display medium layer 130 between the first substrate 110 and the second substrate 120. The spacers SP1 lean against the first substrate 110 and the second substrate 120, while the spacers SP1 do not lean against the second substrate 120. The changeable gap G1 is compresses when the user presses the touch display device 400, such that the spacers SP2 can temporarily lean against the second substrate 120. In the cases the uses does not press the touch display device 400, the configuration of the spacers SP2 facilitates the gap G1 rapidly restoring to the un touched manner. Additionally, the spacers SP1 and SP2 and the sealant S can be applied to any of the above embodiments.

In summary, the pressure sensing electrode layer and the multi-function electrode layer are set in the touch sensing device of the invention, and a changeable gap is set between the pressure sensing electrode layer and the multi-function electrode layer. Therefore, besides that the multi-function electrode layer may sense a position of a touch point, it may also sense a magnitude of a touch pressure in collaboration with the pressure sensing electrode layer, so as to achieve multi-sensing functions. Moreover, the multi-function electrode layer is disposed in the pixel array structure, which not only provides a touch sensing function, but also provides a display function, so that the touch display device is unnecessary to use an independent touch element to implement a touch function, which avails reducing a thickness and a volume of the touch sensing device. In addition, since the touch display device of the invention may sense a magnitude of a touch pressure, the touch display device may provide a 3D touch function.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch display device, comprising:
a first substrate;
a second substrate;
a display medium layer, disposed between the first substrate and the second substrate;
a pixel array structure, disposed between the second substrate and the display medium layer, and comprising a plurality of pixel electrodes and a multi-function electrode layer overlapping with the pixel electrodes and being deposed over the second substrate; and
a pressure sensing electrode layer, disposed over the first substrate to be opposite to and parallel to the multi-function electrode layer, and a changeable gap being formed between the pressure sensing electrode layer and the multi-function electrode layer;
wherein the multi-function electrode layer comprises a plurality of independent multi-function electrodes each being capable of being independently charged or discharged such that the multi-function electrode layer has capability of performing self-capacitive touch sensing and pressure touch sensing; and
wherein signals of the pressure sensing electrode layer and the multi-function electrode layer are allowed to be synchronized.

2. The touch display device as claimed in claim 1, wherein each of the multi-function electrodes is overlapped with two or more pixel electrodes.

3. The touch display device as claimed in claim 1, wherein the multi-function electrode layer is located between the pixel electrodes and the second substrate, and each of the pixel electrodes has a plurality of slits.

4. The touch display device as claimed in claim 1, wherein the pixel electrodes are located between the multi-function electrode layer and the second substrate, and the multi-function electrode layer has a plurality of slits.

5. The touch display device as claimed in claim 1, wherein the pressure sensing electrode layer is disposed between the first substrate and the display medium layer.

6. The touch display device as claimed in claim 5, further comprising a black matrix layer disposed between the pressure sensing electrode layer and the first substrate, wherein the black matrix layer comprises a plurality of light-shielding strips.

7. The touch display device as claimed in claim 1, further comprising a backlight module, wherein the second substrate is located between the first substrate and the backlight module, and the pressure sensing electrode layer is disposed on one side of the backlight module away from the second substrate.

8. The touch display device as claimed in claim 7, wherein the pressure sensing electrode layer is an entire piece of a conductive layer.

9. The touch display device as claimed in claim 1, wherein the backlight module comprises a back plate, spaced apart from the second substrate by a distance, and the pressure sensing electrode layer is disposed thereon.

10. A touch display device comprising:
a first substrate;
a second substrate;
a display medium layer disposed between the first substrate and the second substrate;
a pixel array structure being disposed between the second substrate and the display medium layer, and comprising a plurality of pixel electrodes and a multi-function electrode layer overlapping with the pixel electrodes;
a pressure sensing electrode layer disposed between the first substrate and the display medium layer to be parallel to the multi-function electrode layer, and a changeable gap being formed between the pressure sensing electrode layer and the multi-function electrode layer; and
a black matrix layer being disposed between the pressure sensing electrode layer and the first substrate, and comprising a plurality of light-shielding strips;
wherein the pressure sensing electrode layer comprises a plurality of electrode strips located within an area of the light-shielding strips.

11. The touch display device as claimed in claim 10, wherein an orthogonal projection of the pixel electrodes on the second substrate is separated from an orthogonal projection of the electrode strips on the second substrate.

12. The touch display device as claimed in claim 10, wherein an orthogonal projection of the electrode strips on the second substrate is overlapped with an orthogonal projection of the multi-function electrode layer on the second substrate.

13. The touch display device as claimed in claim 10, wherein the electrode strips are connected to form a grid.

14. A driving method of a touch display device comprising a first substrate, a second substrate, a display medium layer disposed between the first substrate and the second substrate, a pixel array structure being disposed between the second substrate and the display medium layer and comprising a plurality of pixel electrodes and a multi-function electrode layer overlapping with the pixel electrodes, and a pressure sensing electrode layer disposed to be parallel to the multi-function electrode layer with a changeable gap being formed between the pressure sensing electrode layer and the multi-function electrode layer, comprising:
- implementing a display mode;
- implementing a first touch mode to perform touch sensing through the multi-function electrode layer, and synchronizing signals of the pressure sensing electrode layer and the multi-function electrode layer; and
- implementing a second touch mode by inputting an operating potential to the pressure sensing electrode layer, and performing touch sensing through the multi-function electrode layer.

15. The driving method of the touch display device as claimed in claim 14, wherein in the second touch mode, the operation potential is a fixed potential of a ground potential or a common potential; a variable potential inverted and synchronous to a signal of the multi-function electrode layer; or a variable potential non-inverted and synchronous but having a different amplitude relative to the signal of the multi-function electrode layer.

16. The driving method of the touch display device as claimed in claim 14, wherein in the display mode, a display potential is input to the pixel electrodes, a common potential is input to the multi-function electrode layer, and a fixed potential is input to the pressure sensing electrode layer.

17. The driving method of the touch display device as claimed in claim 14, wherein in the first touch mode and the second touch mode, the pixel electrodes are floating.

18. The driving method of the touch display device as claimed in claim 14, wherein a difference between sensing signals received by the multi-function electrode layer in the first touch mode and the second touch mode is taken as a pressure touch sensing signal value.

19. The driving method of the touch display device as claimed in claim 18, wherein the pressure touch sensing signal value is varied along with the changeable gap.

20. The driving method of the touch display device as claimed in claim 14, wherein implementing frequencies of the display mode, the first touch mode and the second touch mode are independent to each other.

* * * * *